G. S. JERVIS.
SEEDER.
APPLICATION FILED FEB. 14, 1918.
1,300,400.
Patented Apr. 15, 1919.
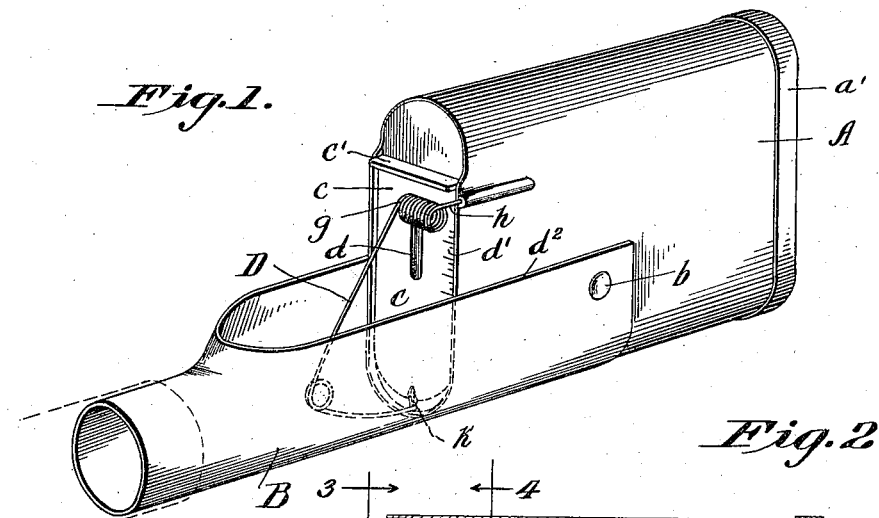
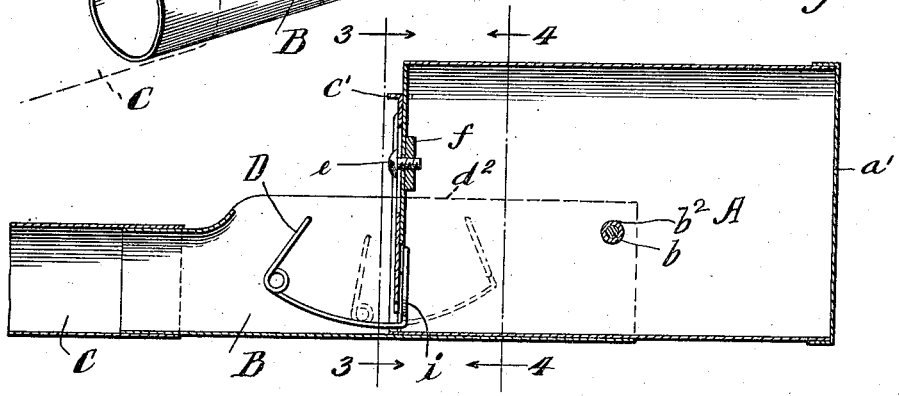
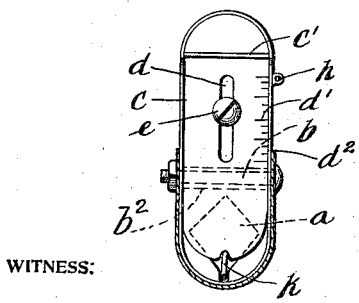
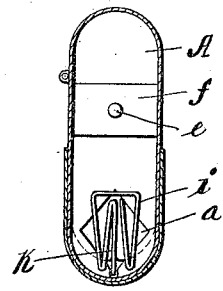
WITNESS:
INVENTOR
George Scudder Jervis.
BY
ATTORNEY

UNITED STATES PATENT OFFICE.

GEORGE SCUDDER JERVIS, OF COPIAGUE, NEW YORK.

SEEDER.

1,300,400.  Specification of Letters Patent.  Patented Apr. 15, 1919.

Application filed February 14, 1918. Serial No. 217,023.

*To all whom it may concern:*

Be it known that I, GEORGE SCUDDER JERVIS, a citizen of the United States, residing in Copiague, Long Island, county of Suffolk, and State of New York, have invented a certain new and useful Seeder, of which the following is a specification.

This invention is a seeder, and the object of the invention is a device of the character specified, which is simple in construction, economical to manufacture, and efficient in operation.

From a structural standpoint, the main elements of the invention are a seed container having an outlet for the seed, means for adjusting the size of the outlet, whereby the device is adapted for use with various kinds and sizes of seed, and an agitator, preferably in the form of a spring, for agitating the seed and controlling the feed of the seed.

In the preferred embodiment of the invention, a spout, for directing the path of the seed, is associated with the container outlet, and a tube may be employed in conjunction with the spout, whereby the seed may be dropped in place while the user of the device is in a standing or erect position.

Features of the invention, other than those described, will appear from the hereinafter detailed description of the device, taken in conjunction with the drawings, forming a part hereof, and the appended claims.

The drawings illustrate the preferred practical embodiment of the invention, but, it will be understood, it is not confined to the specific structure shown, the same being typical, but not exclusive, of the forms in which the invention may be embodied.

Referring to the drawings, Figure 1 is a perspective view of the device;

Fig. 2 is a longitudinal sectional view;

Fig. 3 is a sectional elevation on line 3—3 of Fig. 2, looking in the direction of the arrows associated with said line; and Fig. 4 is a sectional elevation on line 4—4 of Fig. 2, looking in the direction of the arrows associated with said line.

Referring to the drawings, A is the seed container having an outlet $a$, preferably of rectangular shape, as shown, for the purpose hereinafter referred to, and a cover $a'$ which permits the introduction of seed into the container. B is a seed spout which may be employed, and it is shown as affixed to container A by means of a bolt $b$, (see Figs. 2 and 3.) A delivery tube C may or may not be used in conjunction with spout B, the employment of the tube permitting the seeds to be dropped while standing. This tube is preferably slipped over the end of the spout, as shown, more particularly, in Fig. 2. Bolt $b$ may be provided with a loosely fitting sleeve $b^2$, interiorly of the container, and extending between the side walls thereof. This construction permits of bolt $b$ being tightened without compressing the side walls of the container.

Coöperating with seed outlet $a$ is a slide $c$, provided with a slot $d$, whereby said slide may be adjusted relatively to said outlet $a$, whereby the size of the latter may be regulated, thereby adapting the seeder to be efficiently used with seeds of various size. The slide may be provided with a suitable scale, as $d'$, which coöperates with some mark on the side or other fixed part on the container, e. g., the top edge of spout B, whereby the height of opening $a$ may be accurately set for seeds of different sizes. Moreover, the side of the container might be provided with directions to indicate the correct adjustment for different seeds; e. g., numeral 1 might indicate the point of adjustment for carrots, 2 for lettuce, 3 for beets, etc.

Slide $c$ is securely locked in its desired adjustable position by means of a screw $e$ extending through slot $d$, and threading into a plate or boss $f$ on the inside of the front wall of the container and extending from side to side thereof, as shown in Fig. 4. This construction permits of bolt $e$ being screwed into and out of the plate without causing the latter to rotate or be dislodged. If desired, slide $c$ may be provided with a lip $c'$, or other expedient, to facilitate moving it into its various adjustable positions.

A spring D is employed to control the feed of the seed through opening $a$, and the tension on the spring, due to coil $g$ and the securing of end $h$ to the side of the container, by pressing outwardly the side of the container, or otherwise, is in such direction as to tend to draw the other end $i$ of the spring outwardly against the inner side of the front wall in registration with opening $a$, thereby normally closing said opening. When, however, the spring is pressed backwardly, see dotted position, Fig. 2, the opening $a$ is unsealed and the seeds drop out.

The end $i$ of the spring is bent as shown, see Fig. 4, with its central lead $k$, positioned centrally of opening $a$. This specified construction and arrangement of the end of the spring, coöperating with the diamond shaped opening $a$, and slide $c$, permits of reducing the size of the opening so as to feed very small seed therefrom, see Figs. 3 and 4, and yet the positioning of the central lead $k$ of the spring, as specified, precludes inadvertent discharge of said seed. The reciprocation of the end $i$ of the spring serves to agitate and thus facilitate the discharge of the seed from the container.

From the foregoing description, the manner of using the seeder will be readily understood, but it may be briefly described as follows: The container having been charged with the desired seed, and the slide $c$ coöperating with the seed outlet, properly adjusted, the operator, holding the device in one hand, manipulates spring D with his thumb or finger thereby unsealing the seed outlet and permitting the seed to drop into a drill, hill, or other location. The seed may be fed intermittently or continuously at the will of the operator. The device is simple to operate and specially efficient for its intended purposes.

It will be understood that slight changes may be made in the device described, such as the substitution of equivalents, without departing from the spirit of the invention, and that parts of the specific structure described may be employed without necessarily employing the entire structure, the scope of the invention being as broadly novel as is commensurate with the appended claims.

Having thus fully described the invention, what I claim as new, and desire to secure by Letters Patent, is:

1. A seeder embodying a seed container, a seed outlet therefrom, means for adjusting the size of said outlet, and a spring with a bent end for manually controlling the flow of seed from said outlet.

2. A seeder embodying a seed container, a seed outlet therefrom, means for adjusting the size of said outlet, and a spring with a looped end for agitating the seed in the container and for controlling the flow of seed through the outlet.

3. A seeder embodying a seed container, a seed outlet therefrom, a slide or valve for controlling the size of said outlet, a spring with a bent end for sealing the outlet when the slide is in one of its open positions, and means for manually operating the spring so as to unseal the opening and thereby permit seed to be fed therefrom.

4. A seeder embodying a seed container, a seed outlet therefrom, a coiled spring, one end of which is secured to the container and the other end of which is looped and positioned interiorly of the container so as to normally seal the seed outlet, said spring being manually operable to unseal said outlet and thereby permit seed to be fed therethrough.

5. A seeder embodying a seed container, a seed outlet therefrom, having a substantially diamond shape with one of the angles thereof positioned near the bottom and forward portion of the container, means for varying the size of said opening, a looped spring member for sealing said opening regardless of its size, and means for operating said sealing members so as to free the opening and permit seed to pass therethrough.

6. A seeder embodying a seed container, a seed outlet therefrom, means for varying the size of the outlet and a spring for controlling the flow of seed therefrom, and a spout coöperating with said outlet.

7. A seeder, embodying a seed container, a seed outlet therefrom, means for varying the size of the outlet, and a spring secured exteriorly of the container and having an end portion positioned interiorly of the casing, said portion forming a valve for controlling the flow of seed through the outlet, the portion of the spring exteriorly of the casing forming a means for operating the valve.

8. A seeder, embodying a seed container, a seed outlet therefrom, means for varying the size of the outlet, and a spring secured exteriorly of the container and having an end portion positioned interiorly of the casing, said portion forming a valve for controlling the flow of seed through the outlet, the portion of the spring exteriorly of the casing forming a means for operating the valve, in combination with a spout leading from the seed outlet, and a feed tube associated with the spout.

9. A seeder embodying a seed container, a seed outlet therefrom, a spring having a looped end interiorly of the container and serving to normally close said outlet to prevent the flow of seed therefrom, and means for retracting said looped end so as to free the outlet and permit seed to escape therefrom.

In testimony whereof, I have signed my name to this specification.

GEORGE SCUDDER JERVIS.